(12) United States Patent
Ehlen

(10) Patent No.: US 9,251,841 B1
(45) Date of Patent: Feb. 2, 2016

(54) DISC DRIVE INCLUDING A TRAY SUPPORT MECHANISM AND DISC DRIVE MODULES INCORPORATING THE SAME

(71) Applicant: Facebook, Inc., Menlo Park, CA (US)

(72) Inventor: Jon Brian Ehlen, Newark, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/731,052

(22) Filed: Jun. 4, 2015

(51) Int. Cl.
*G11B 17/056* (2006.01)

(52) U.S. Cl.
CPC .................... *G11B 17/056* (2013.01)

(58) Field of Classification Search
CPC ..... G11B 17/056; G11B 17/225; G11B 17/26
USPC ................................. 720/615, 610
See application file for complete search history.

(56) References Cited

U.S. PATENT DOCUMENTS

| | | | |
|---|---|---|---|
| 5,841,744 A * | 11/1998 | Menke et al. | 369/30.85 |
| 8,898,683 B2 * | 11/2014 | Higaki et al. | 720/610 |
| 2005/0185529 A1 * | 8/2005 | Moribe et al. | 369/30.38 |

* cited by examiner

*Primary Examiner* — Angel Castro
(74) *Attorney, Agent, or Firm* — Perkins Coie LLP

(57) ABSTRACT

Technology is provided for a disc drive for use in a disc drive module having two or more opposed disc drives. The disc drive comprises a disc drive housing and a disc tray movable in and out of the disc drive housing between an open position and a closed position. A support tab is pivotably coupled to the disc tray and pivotable between an extended position and a stowed position. The support tab is biased toward the extended position and is mateable with an opposing disc drive when the disc tray is in the open position. A bumper is positioned in the disc drive housing to abut the support tab and rotate the support tab toward the stowed position when the disc tray is moved from the open position to the closed position.

21 Claims, 5 Drawing Sheets

DISC DRIVE INCLUDING A TRAY SUPPORT MECHANISM AND DISC DRIVE MODULES INCORPORATING THE SAME

TECHNICAL FIELD

This patent application is directed to data storage server configurations and, more specifically, to a disc drive tray support mechanism, disc drives, and disc drive modules incorporating the same.

BACKGROUND

An opposed-drive disc drive module includes a plurality of disc drives arranged in a pair of stacks that face each other in an opposed configuration. Each disc drive has a disc tray that can receive and support one or more selected discs during operation of the module. A disc robot is positioned between the stacks to periodically load and unload the discs into or out of the disc drives. It is often necessary for multiple discs to be temporarily held by a single disc tray during disc handling (e.g., loading and unloading). In conventional opposed-drive disc drive modules, the disc tray is supported during disc handling operations by a support arm that extends linearly from an opposed disc drive. While the support arm is extended, the opposed disc drive is unable to read or write. Accordingly, there is need for a tray support mechanism that allows disc drives to read and write data while supporting an extended disc tray.

BRIEF DESCRIPTION OF THE DRAWINGS

Embodiments of the disc drive tray support mechanism, disc drives, and disc drive modules introduced herein may be better understood by referring to the following Detailed Description in conjunction with the accompanying drawings, in which like reference numerals indicate identical or functionally similar elements.

Figure 1:
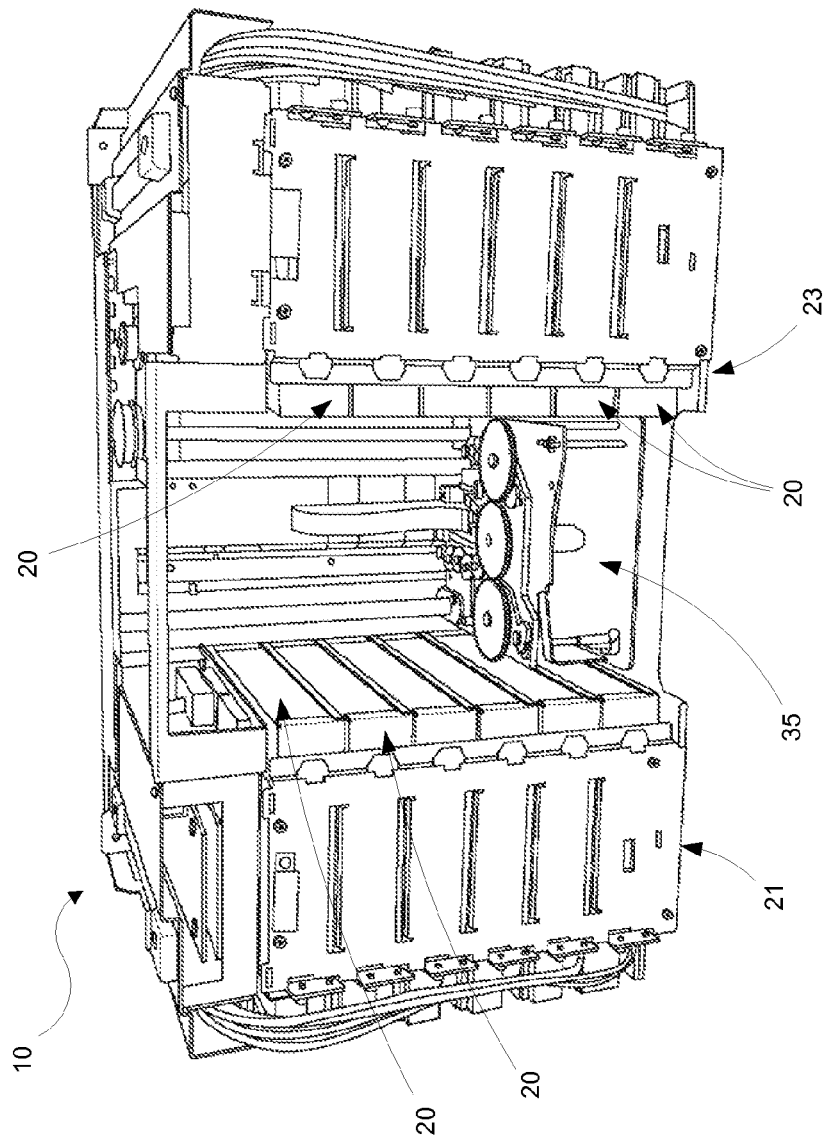
FIG. 1 is a perspective view of a conventional opposed-drive disc drive module.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to limit the embodiments described. On the contrary, the embodiments are intended to cover all modifications, equivalents, and alternatives falling within the scope of the embodiments as defined by the appended claims.

DETAILED DESCRIPTION

Overview

A disc drive tray support mechanism for use with an opposed-drive disc drive module is disclosed. The support mechanism includes a support tab pivotably attached by a pivot pin to the underside of a disc drive tray. The support tab is biased with a biasing member toward an extended position. When the disc drive tray is extended for loading, the tab is extended by the biasing member and engages a corresponding slot, for example, located on a disc drive opposite the extended drive tray, thereby supporting the drive tray for robotic loading and unloading operations. In some embodiments, the tab includes a cam surface offset from the pivot pin. When the disc drive tray is retracted toward the closed position, the cam surface abuts a bumper located within the disc drive thereby causing the tab to rotate approximately one-quarter turn to a stowed position.

General Description

Various examples of the devices introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

FIG. 1 illustrates a conventional opposed-drive disc drive module 10 that includes a plurality of disc drives 20. The disc drives 20 are arranged in a pair of stacks 21 and 23 that face each other in an opposed configuration. A disc robot 35 is positioned between the stacks 21 and 23 and is operative to load and unload the disc drives 20.

Figure 2:
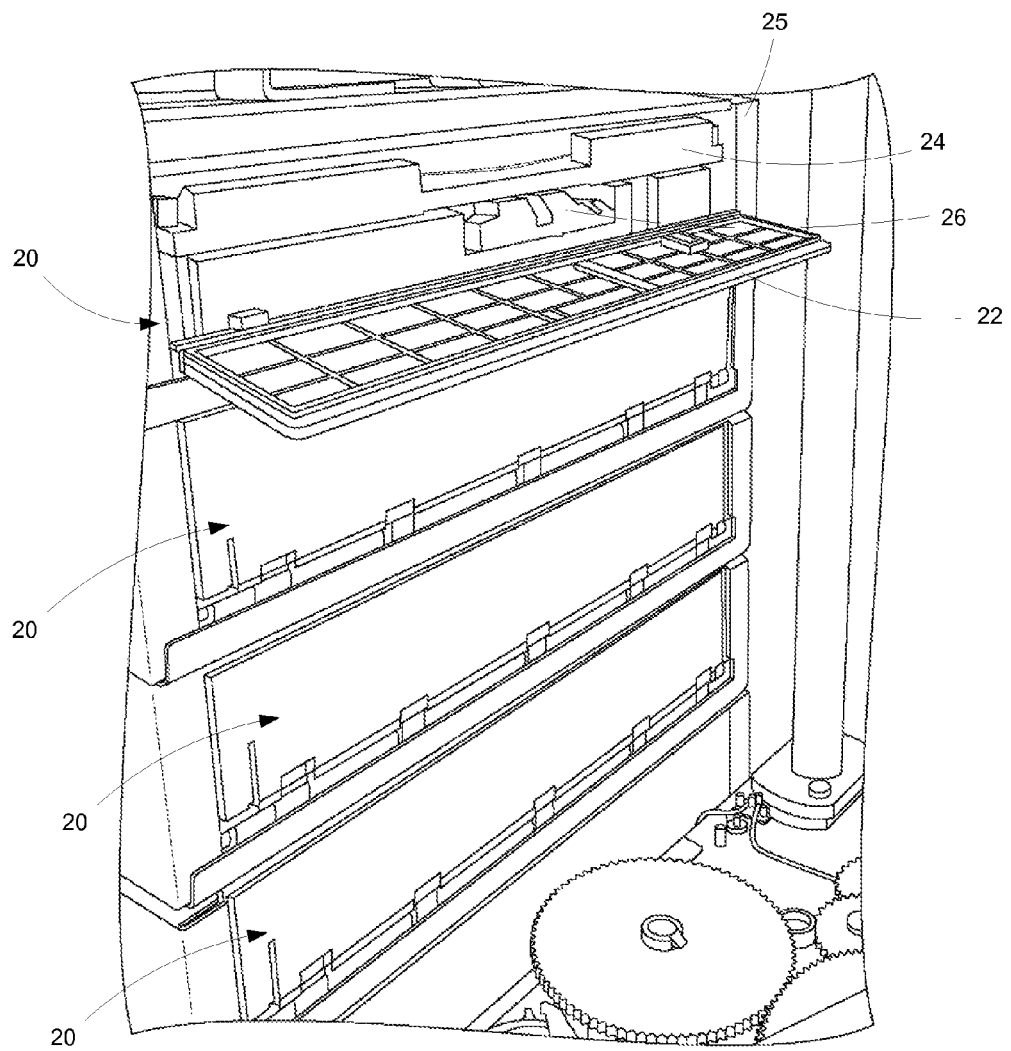
FIG. 2 is an enlarged partial perspective view of the disc drives shown in FIG. 1.

As shown in FIG. 2, each disc drive 20 includes a disc drive housing 25 and a disc tray 24 moveable in and out of the disc drive housing 25 between an open position and a closed position. A support arm 26 moves linearly in and out of the disc drive housing 25 to support a disc tray 24 of an opposing disc drive 20. Disc drive 20 also includes a disc tray door 22 shown here in an open position.

Figure 3:
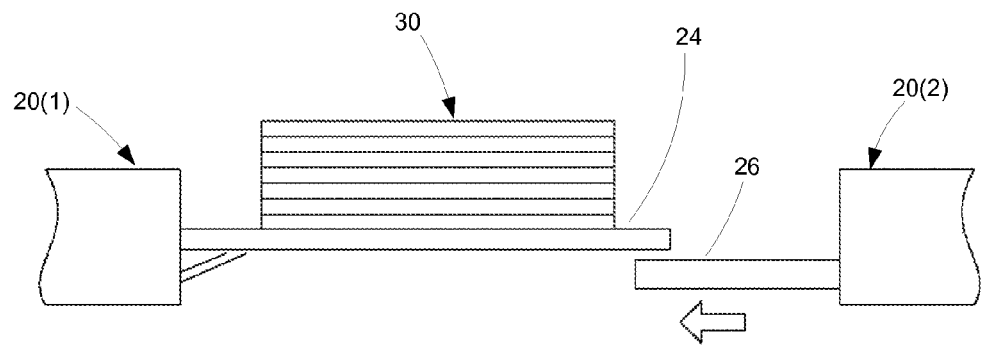
FIG. 3 is a schematic representation of the opposed-drive disc drive module of FIGS. 1 and 2 illustrating a conventional disc tray support arm.

With further reference to FIG. 3, it can be necessary to place multiple discs 30 on the disc tray 24 during disc handling operations. When multiple discs 30 are placed on the disc tray 24, the disc tray 24 may not have enough strength to resist bending and can therefore be overloaded. Accordingly, the support arm 26 extends from the disc drive 20(2) to support the disc tray 24 that extends from the disc drive 20(1). While the support arm 26 is extended, the disc drive 20(2) is unable to read or write data. Accordingly both of the opposing disc drives are temporarily disabled from reading and/or writing data while only one of the disc drives is being loaded and/or unloaded.

Figure 4:
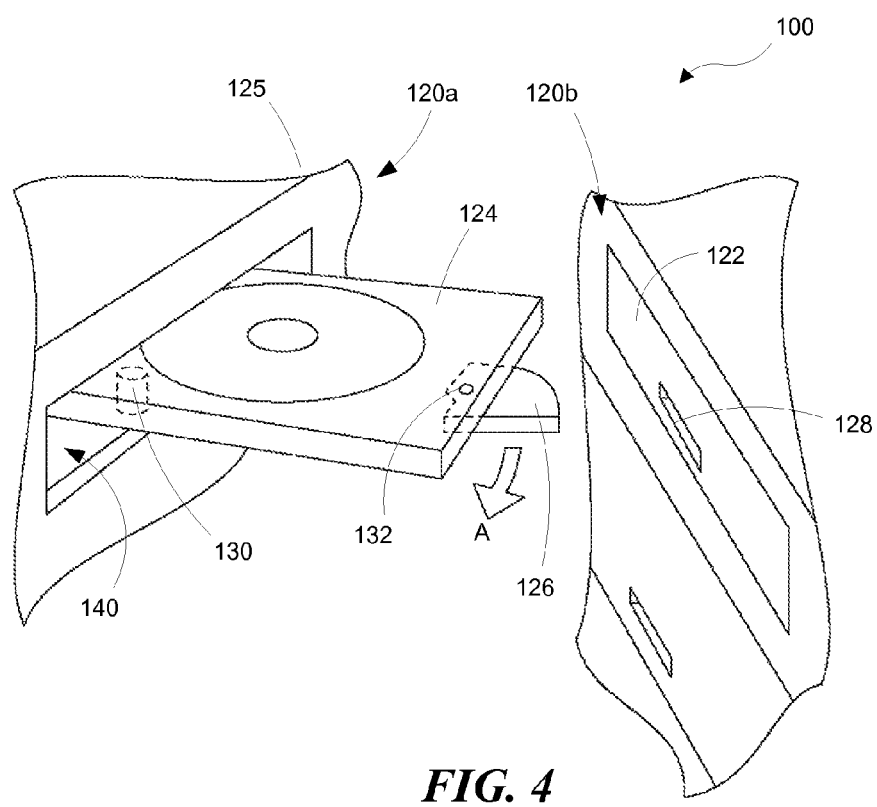
FIG. 4 is an enlarged partial perspective view of an improved opposed-drive disc drive module according to a representative embodiment of the present technology.

FIG. 4 illustrates an improved opposed-drive disc drive module 100 according to a representative embodiment. The disclosed opposed-drive disc drive module 100 allows the disc drives 120 to read and write data while supporting a disc tray 124. The improved opposed-drive disc drive module 100 includes a plurality of opposed disc drives 120 arranged in a pair of stacks that face each other with a disc robot (not shown in FIG. 4) positioned therebetween.

In at least one embodiment, each disc drive 120 of the disc drive module 100 has substantially the same construction, such that the following discussion of one disc drive 120a in one stack with reference to its opposing disc drive 120b in the other stack is applicable to each disc drive 120 in the disc drive module 100. The disc drive 120a includes a housing 125 and a disc tray 124 moveable in and out of the disc drive housing 125 between an open position and a closed position. A support tab 126 is pivotably coupled to a leading edge portion of the disc tray 124, and the support tab 126 is pivotable relative to the disc tray 124 between an extended position and a stowed position. The support tab 126 is biased towards the extended position and is mateable with a portion of the opposing second disc drive 120b when the disc tray 124 of the first disc drive is in the open position. In the embodiment shown in FIG. 4, the disc tray 124 is illustrated in an intermediate position between the open and closed positions, wherein the disc tray is partially extended from the housing 125 with the support tab 126 in the extended position and ready to engage a portion of the closed tray door 122 of the opposing second disc drive 120b. When the disc tray 124 of the first disc drive 120a is in the fully extended and open position, the support tab 126 engages the closed tray door 122 of the second disc drive 120b by extending into an aperture 128 in the tray door 122 laterally aligned with the support tab 126. Accordingly, when the support tab 126 in the extended position is within the aperture 128 in the opposing closed tray door 122 and a vertical load is applied to the disc tray 124, such as when one or more discs are placed on the disc tray, open the disc tray 124 is temporarily supported by the closed tray door of the opposing second disc drive 120b without interrupting operation of the second disc drive 120b. Accordingly, the second disc drive 120b can continue to read and/or write data to the disc therein simultaneously while the first disc drive 120a is being loaded and/or unloaded.

In the embodiment depicted in FIG. 4, the support tab 126 rotates about a pivot 132 from the stowed position to the extended position in a clockwise direction A. In some embodiments, the pivot 132 is a pin fastened to the underside of the disc tray 124. A bumper 130 is positioned in the disc drive housing 125 adjacent to the disc tray 124 and in alignment with the support tab 126, such that when the disc tray 124 moves away from the open position and approaches the fully closed position, a portion of the support tab 126 away from the pivot 132 abuts the bumper, causing the support tab 126 to automatically rotate to the stowed position as the disc tray 124 moves to the fully closed position.

Figure 5A:
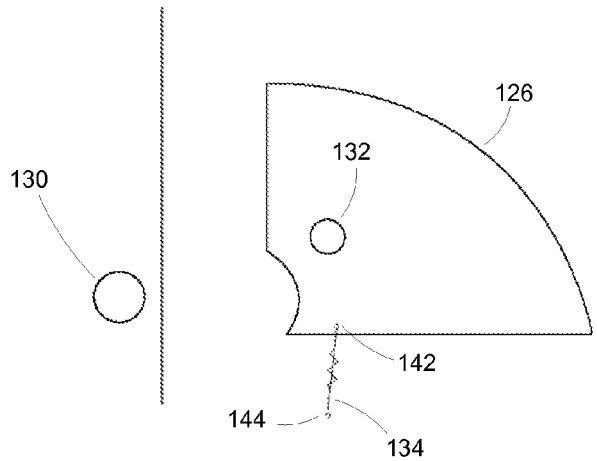
FIG. 5A is a schematic representation of the support tab of FIG. 4 shown in an extended position.
Figure 5B:
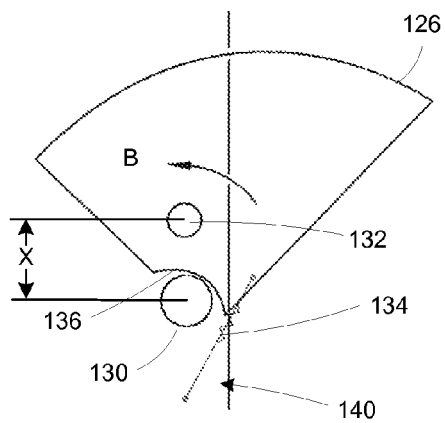
FIG. 5B is a schematic representation of the support tab shown in a partially stowed position.
Figure 5C:
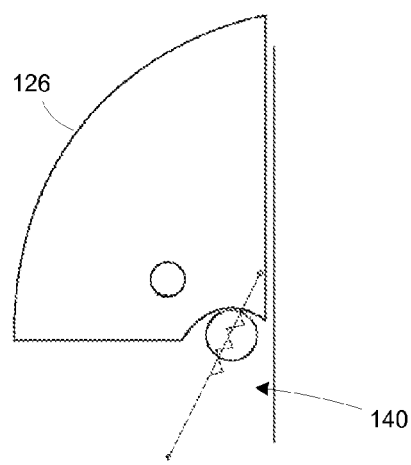
FIG. 5C is a schematic representation of the support tab shown in a stowed position.

With reference to FIG. 5A, the support tab 126 is shown in the extended position. The support tab 126 is biased toward the extended position by a spring 134 or other biasing member. In some embodiments, the spring 134 is an extension spring including a first end portion 142 connected to the support tab 126 and a second end portion 144 connected to the disc tray 124. Although the embodiments depicted herein illustrate spring 134 as being an extension spring, other suitable springs may be used, such as a torsion spring disposed about the pivot 132. As shown in FIG. 5B, the support tab 126 moves toward the stowed position in a counter-clockwise direction as indicated by arrow B. As the support tab 126 enters the disc tray opening 140 and moves toward the fully closed position, the bumper 130 abuts a cam surface 136 an edge portion of the support tab 126 offset from the pivot 132, thereby causing the support tab 126 to rotate about the pivot 132 in the counterclockwise direction B. Bumper 130 and pivot 132 are offset a distance X to facilitate rotating the support tab 126 and overcoming the biasing force from the spring 134. FIG. 5C illustrates support tab 126 in the fully stowed position once the disc tray 124 is fully retracted to the closed position.

Figure 6:
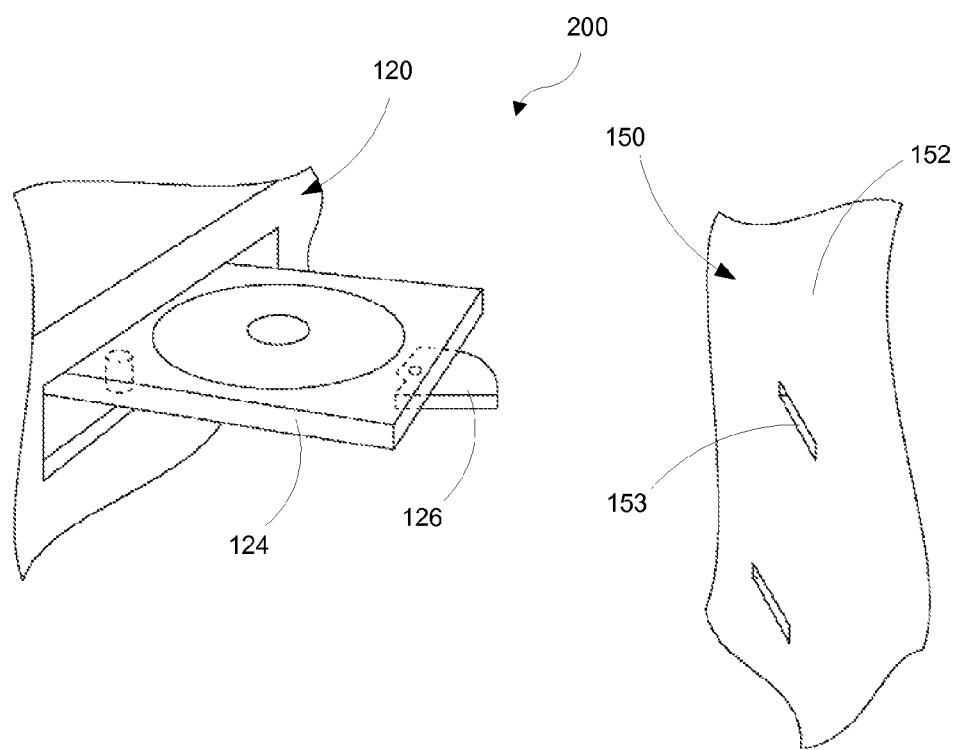
FIG. 6 is an enlarged partial perspective view of a disc drive module according to another representative embodiment of the present technology.

FIG. 6 illustrates a disc drive module 200 according to another representative embodiment. In this embodiment, the disc drive module 200 includes a stacked arrangement of disc drives 120 each including a disc tray 124 and a support tab 126 as explained above with respect to FIG. 4. However, in this embodiment, the stacked disc drives 120 face a support structure 150 positioned opposite the disc drives 120. The support tab 126 is mateable with the support structure 150 when the disc tray 124 is in the open position thereby supporting the disc tray 124 during disc handling operations. In some embodiments, the support structure 150 includes a wall 152 with one or more support features 153 positioned to receive the support tabs 126 of corresponding disc drives 120. In some embodiments, the wall can comprise a sheet metal structure and the support features 153 are slots formed in the wall 152. In various other embodiments, the support structure 150 can comprise a plurality of ledges or beams positioned to support the disc trays 124.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A disc drive for use in a disc drive module having two or more opposed disc drives, the disc drive comprising:
   a disc drive housing;
   a disc tray movable in and out of the disc drive housing between an open position and a closed position;
   a support tab movably coupled to the disc tray and movable between an extended position and a stowed position, wherein the support tab is biased toward the extended position and is mateable with an opposed disc drive when the disc tray is in the open position; and
   a bumper positioned in the disc drive housing positioned to abut the support tab and move the support tab toward the stowed position when the disc tray is moved toward the closed position.

2. The disc drive of claim 1, wherein the support tab has a pivot coupled to the support tray and the support tab rotates about the pivot and wherein the bumper abuts the support tab at a location offset from the pivot.

3. The disc drive of claim 1, further comprising a biasing member coupled to the support tab and configured to urge the support tab toward the extended position.

4. The disc drive of claim 3, wherein the biasing member is an extension spring that includes a first end portion connected to the support tab and a second end portion connected to the disc tray.

5. The disc drive of claim 1, wherein the support tab is attached to a leading edge portion of the disc tray.

6. The disc drive of claim 1, wherein the disc drive further comprises a tray door including an aperture sized and positioned to receive an opposing support tab of an opposing disc drive.

7. An opposed-drive disc drive module, comprising:
   opposing first and second disc drives, the first disc drive including:
   a disc drive housing;
   a disc tray movable in and out of the disc drive housing between an open position and a closed position; and
   a support tab moveably coupled to the disc tray and pivotable between an extended position and a stowed position, wherein the support tab is biased toward the extended position and is mateable with the second disc drive when the disc tray is in the open position without interrupting operation of the second disc drive.

8. The disc drive module of claim 7, further comprising a bumper positioned in the disc drive housing to abut the support tab and rotate the support tab toward the stowed position when the disc tray is moved from the open position to the closed position.

9. The disc drive module of claim 7, wherein the second disc drive includes:
   a second disc drive housing;
   a second disc tray movable in and out of the second housing between an open position and a closed position; and
   a second support tab moveably coupled to the second disc tray and pivotable between an extended position and a stowed position, wherein the second support tab is biased toward the extended position and is mateable with the first disc drive when the second disc tray is in the open position.

10. The disc drive module of claim 9, a second bumper positioned in the second disc drive housing to abut the second support tab and rotate the second support tab toward the stowed position when the second disc tray is moved from the open position to the closed position.

11. The disc drive module of claim 9, wherein the second disc drive includes a disc tray door having a slot configured to receive the support tab.

12. The disc drive module of claim 7, further comprising a disc robot positioned between the first and second disc drives.

13. A disc drive module, comprising:
   one or more disc drives and a support structure positioned opposite the one or more disc drives, selected ones of the one or more disc drives including:
   a disc drive housing;
   a disc tray movable in and out of the disc drive housing between an open position and a closed position; and
   a support tab pivotably coupled to the disc tray and pivotable between an extended position and a stowed position, wherein the support tab is biased toward the extended position and is mateable with the support structure when the disc tray is in the open position.

14. The disc drive module of claim 13, wherein the support structure is a second disc drive opposite the selected ones of one or more disc drives.

15. The disc drive module of claim 13, further comprising a bumper positioned in the disc drive housing to abut the support tab and rotate the support tab toward the stowed position when the disc tray is moved from the open position to the closed position.

16. The disc drive module of claim 13, wherein the disc drive includes a disc tray door.

17. The disc drive module of claim 13, further comprising a disc robot positioned between the one or more disc drives and the support structure.

18. The disc drive module of claim 13, wherein the support structure includes one or more support features positioned to receive the support tab corresponding to the selected ones of the one or more disc drives.

19. The disc drive module of claim 18, wherein the support structure comprises a wall and the one or more support features comprise slots formed in the wall.

20. The disc drive module of claim 13, wherein the one or more disc drives comprises a plurality of disc drives arranged in a stacked configuration.

21. The disc drive module of claim 13, wherein the support tab is biased with a spring and wherein the spring includes a first end portion connected to the support tab and a second end portion connected to the disc tray.

* * * * *